July 15, 1952     L. L. SHERWOOD     2,603,013
ADJUSTABLE FRAME FOR MOTOR VEHICLE LICENSE PLATES
Filed Aug. 15, 1949
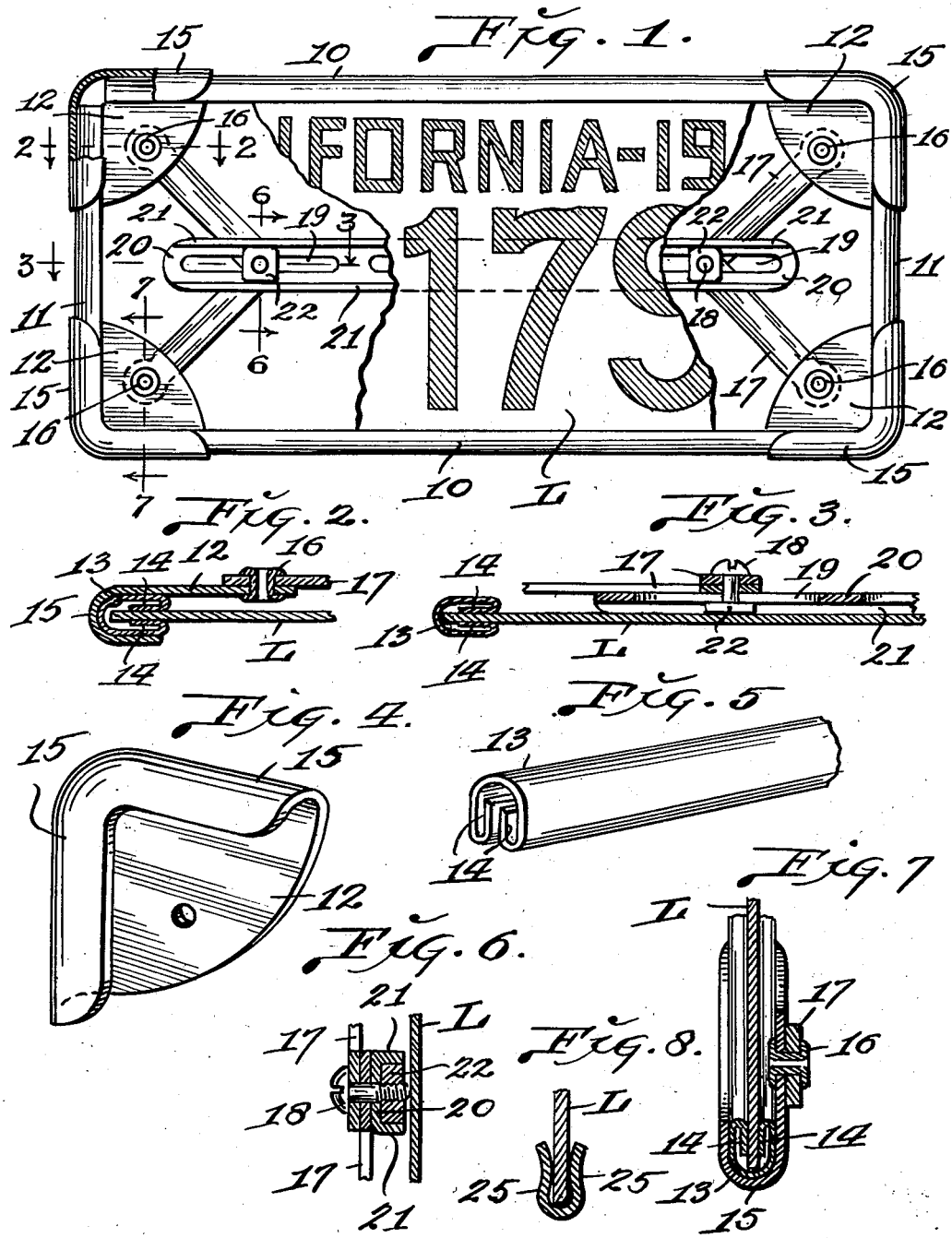
Inventor
LESTER L. SHERWOOD
By Martin P. Smith
Attorney Patented July 15, 1952

2,603,013

UNITED STATES PATENT OFFICE 2,603,013

ADJUSTABLE FRAME FOR MOTOR VEHICLE LICENSE PLATES

Lester L. Sherwood, Banning, Calif.

Application August 15, 1949, Serial No. 110,328

1 Claim. (Cl. 40—125)

My invention relates to adjustable frames for receiving and firmly holding the license number bearing plates which, under law, are required to be mounted on motor vehicles, and the principal objects of my invention are, to provide a simple, practical and inexpensive frame of compact structure, light in weight and of neat and finished appearance, which may be readily manipulated and adjusted so as to be applied to license plates of varying sizes.

A further object of my invention is, to provide a license plate holder of the character referred to, which provides the license plate with a narrow marginal frame, the structure of which is such as to firmly grip and hold the plate without the use of screws, bolts, rivets and the like and without the possibility of vibration and consequent rattle of the plate within the frame.

With the foregoing and other objects in view, my invention consists of certain novel features of construction and arrangement of parts which will be hereinafter more fully described and claimed and illustrated in the accompanying drawing, in which:

Fig. 1 is a front elevational view of my improved frame, enclosing a license plate, with portions of the latter broken away to more clearly illustrate the structure of the frame, Fig. 2 is an enlarged horizontal section taken on the line 2—2 of Fig. 1, Fig. 3 is an enlarged horizontal section taken on the line 3—3 of Fig. 1, Fig. 4 is a perspective view of one of the corner pieces of the frame, Fig. 5 is a perspective view of a portion of one of the marginal rails of the frame, Fig. 6 is an enlarged detail section taken on the line 6—6 of Fig. 1, Fig. 7 is an enlarged vertical section taken on the line 7—7 of Fig. 1.

Fig. 8 is a detail cross section showing a modified form of the frame forming rails.

As shown in the drawing, my improved frame includes two identical top and bottom rails 10, two shorter identical end rails 11 and four substantially triangular corner plates 12, one of the latter being shown in Fig. 4.

Rails 10 and 11 are formed from strips of thin sheet material, preferably metal having a certain degree of resiliency, which strips are by suitable means, bent to form substantially U-shaped body portions 13, with those portions of the longitudinal edges of the strip disposed lengthwise, in spaced relation with respect to each other, between and in spaced relation to the parallel side walls of said U-shaped body portion 13, thus providing resilient flanges 14 which directly engage and grip both faces of the license plate L adjacent its marginal edges as shown in Figs. 2, 3 and 7.

This yielding grip or engagement of the marginal rails of the frame with the license plate, effectually prevents vibration and consequent rattling of the latter.

Rails 10 and 11 may be produced in long sections and cut into short sections corresponding to the length and width of license plates of different dimensions. Those marginal portions of the corner plates 12 which are disposed ninety degrees apart, are bent to one side to form channels 15 which snugly receive the end portions of rails 10 and 11 and pivotally connected to the central portions of said corner plates by rivets or pins 16, are the outer ends of links 17.

The inner ends of these links are pivotally mounted on bolts 18 which pass through longitudinally disposed slots 19, formed in the end portions of a horizontally disposed bar 20, positioned directly behind the rear central portion of plate L (see Fig. 6).

Bar 20 is provided, top and bottom, with longitudinal flanges 21 and mounted to slide therebetween, are nuts 22, which receive the threaded ends of bolts 18. The construction just described enables the corner plates of the frame to be adjusted toward and away from each other so as to accommodate license plates of different dimensions and after proper adjustment, the bolts 18 are tightened in nuts 22 to clamp the inner ends of links 17 to bar 20, thus rendering the frame rigid and securely clamping same upon the license plate.

It is to be understood that when adjusting the frame upon the license plate, the ends of rails 13 slide lengthwise in channels 15 until said ends abut one another in the corners between channels 15 of the corner plates (see Fig. 1).

The frame with the license plate rigidly clamped therein may be mounted on the motor vehicle in any suitable manner, for instance, by conventional brackets detachably secured to the central portion of bar 20.

Thus, it will be seen that I have provided an adjustable frame for motor vehicle license plates that is simple in structure, inexpensive of manufacture and very effective in performing the functions for which it is intended.

Minor changes in the size, form and construction of the various parts of my improved license plate frame may be made and substituted for those herein shown and described without departing from the spirit of my invention, the scope of which is set forth in the appended claim.

In Fig. 8 I have shown a modified form of the frame forming rails, such form being especially applicable where the rails are formed of resilient sheet metal, slightly thicker than the material forming the rail bodies 13 and flanges 14.

In the modification the sheet metal strip is bent so that it is U-shape in cross section, thereby forming substantially parallel flanges 25 spaced so as to frictionally engage and grip the inserted edges of the license plate.

I claim as my invention:

An adjustable frame for motor vehicle license plates, comprising corner pieces having channel shaped outer portions, frame forming rails having their ends seated in the channel shaped outer portions of said corner pieces, said frame forming rails having inturned inner edges for engagement with an inserted motor vehicle license plate, links pivoted to the rear faces of said corner pieces and a slotted bar pivotally and adjustably connected to the inner ends of said links and forming a support for the completed structure.

LESTER L. SHERWOOD.

REFERENCES CITED

The following references are of record in the file of this patent:

UNITED STATES PATENTS

| Number | Name | Date |
|---|---|---|
| 758,120 | Trumbull | Apr. 26, 1904 |
| 1,488,098 | Critharis | Mar. 25, 1924 |
| 1,778,660 | Cederberg et al. | Oct. 14, 1930 |
| 1,793,696 | Ipsen | Feb. 24, 1931 |
| 2,185,084 | Hutaff | Dec. 26, 1939 |